Feb. 23, 1932.   G. GREESON ET AL   1,846,718
OIL RECLAIMING APPARATUS
Filed June 29, 1931   2 Sheets-Sheet 1

Grant Greeson,
Byron D. Tansey, INVENTORS
BY Victor J. Evans
and Co. ATTORNEYS

WITNESS

Feb. 23, 1932.  G. GREESON ET AL  1,846,718
OIL RECLAIMING APPARATUS
Filed June 29, 1931  2 Sheets-Sheet 2

Grant Greeson,
Byron D. Tansey, INVENTORS
BY Victor J. Evans
and Co. ATTORNEYS

WITNESS: P. J. Hickey

Patented Feb. 23, 1932

1,846,718

UNITED STATES PATENT OFFICE

GRANT GREESON AND BYRON D. TANSEY, OF CLINTON, OKLAHOMA

OIL RECLAIMING APPARATUS

Application filed June 29, 1931. Serial No. 547,724.

This invention relates to oil reclaiming apparatus and has for the primary object, the provision of means whereby used oil may be subjected to varying temperatures and thoroughly agitated by steam and then passed through a filter so that foreign matter will be removed therefrom and place the oil in condition for further use free of impurities and other substances which had rendered the oil unfit for use, thereby rendering a large saving in oil, heretofore discarded, for further use as a lubricant.

Another object of this invention is the provision of an oil reclaiming apparatus of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a vertical sectional view illustrating an oil reclaiming apparatus constructed in accordance with our invention.

Figure 1:
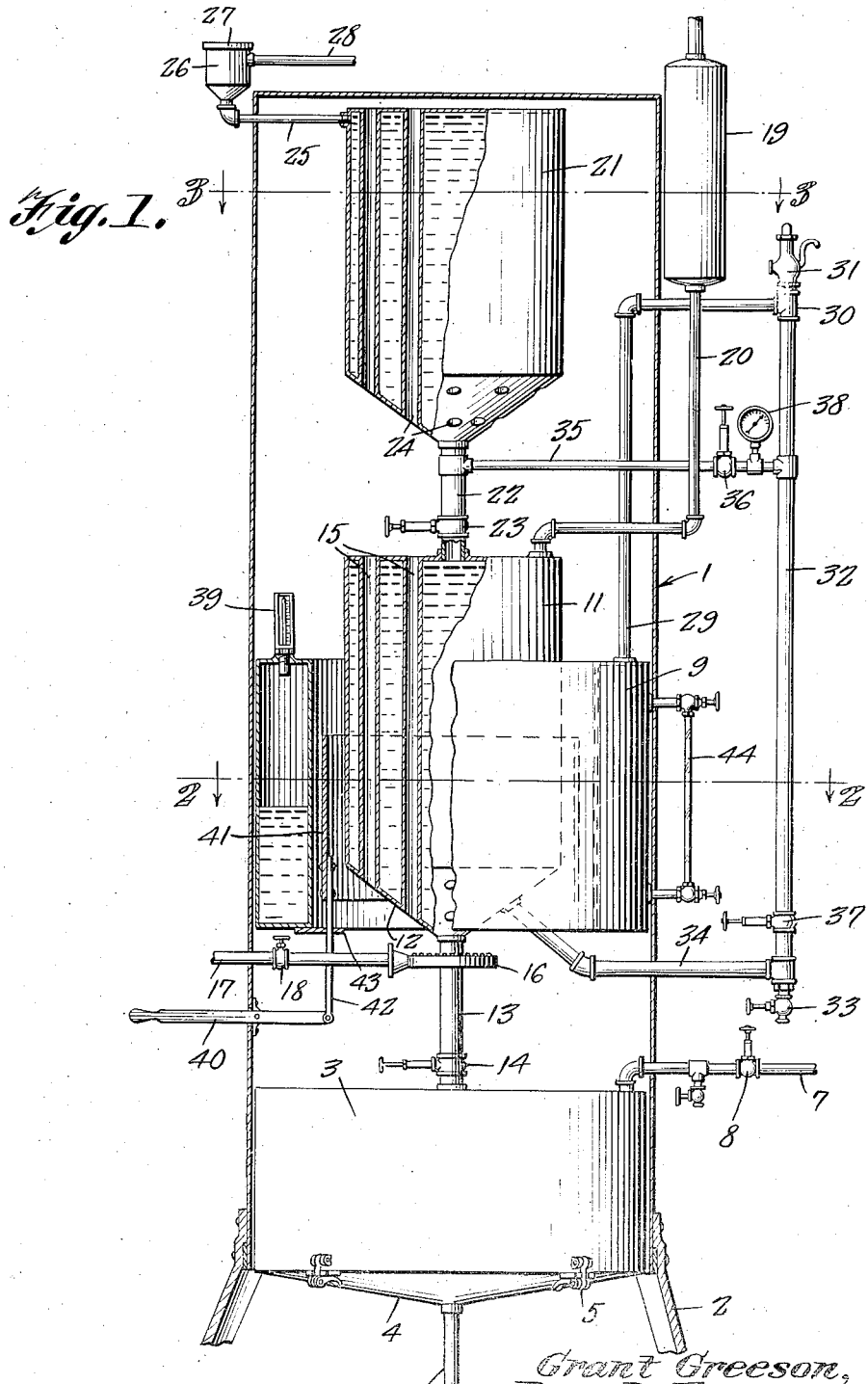
Figure 2:
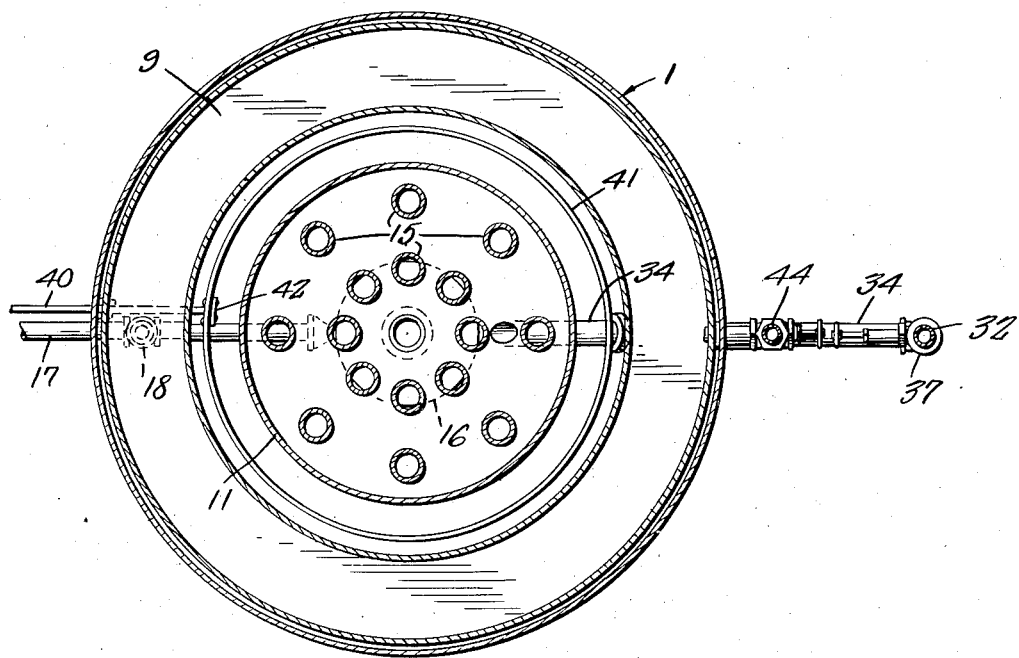
Figure 2 is a sectional view taken on the line 2—2 of Figure 1.
Figure 3:
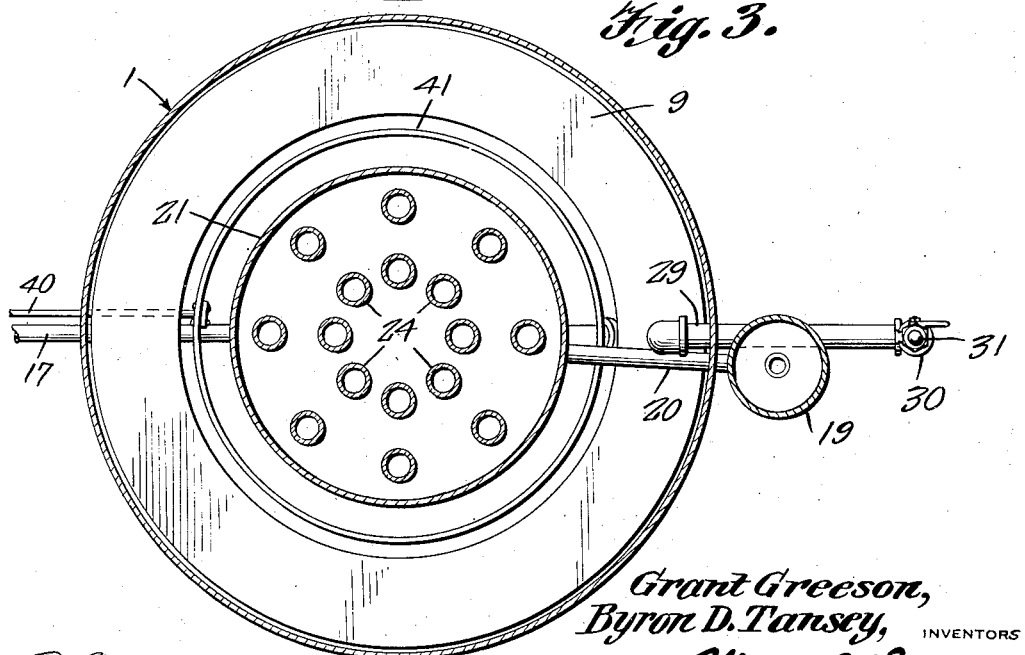
Figure 3 is a similar view taken on the line 3—3 of Figure 1.

Referring in detail to the drawings, the numeral 1 indicates an outer casing supported by a plurality of legs 2 and has suitably mounted in its lower end a filter 3 provided with a removable bottom 4 held in place by fasteners 5. The interior of the filter 3 may be of any desired construction and preferably of the type containing a fibrous filtering element through which fluid may be passed for removing foreign matter therefrom and the bottom wall 4 of the filter 3 is provided with a suitable drain pipe or medium 6. An air pressure pipe 7 is in communication with the interior of the filter and is provided with a control valve 8 whereby air pressure may be introduced into the filter for the purpose of forcing outwardly therefrom oil or similar fluid by way of the discharge medium 6.

A boiler 9 is mounted in the casing 1 above the filter 3 and has a chamber 10 extending therethrough in which is mounted or located an oil treating tank 11, the lower end of which is of conical shape as shown at 12 and connected to a drain pipe 13 leading to the filter 3 and provided with a control valve 14. The oil treating tank 11 is provided with a series of flues 15 that extend through the ends of the tank for the purpose of permitting heat from a burner 16 to pass through the tank 11 at spaced intervals. The burner 16 is located below the boiler 9 and the tank 11 and may be of any desired construction and provided with a feed pipe 17 having a control valve 18. The upper end of the oil treating tank 11 is connected to an expansion tank 19 by a pipe 20 and is located exteriorly of the casing 1 and in a plane above the tank 11 and boiler 9.

Another oil treating tank 21 is arranged above the tank 11 within the casing 1 and is similar in construction to said tank 11 and is connected to the upper end of the tank 11 by a pipe 22 having a control valve 23. The flues 24 of the tank 21 are arranged above the flues 15 so that the heat discharged from the flues 15 will enter the flues 24 and pass through the tank 21 for the purpose of heating the contents therein. A supply pipe 25 is connected to the upper end of the tank 21 and extends outwardly of the casing 1 and is connected to an expansion chamber 26 having a removable cap 27 and a supply pipe 28 and the latter named supply pipe is adapted to receive used oil and deliver the same into the tank 21 or if desired the cap 27 may be removed and the oil poured directly into the expansion chamber 26 and thence into the tank 21.

A steam pipe 29 is connected to the upper end of the boiler 9 and extends exteriorly of the casing 1 and is provided with a coupling 30 to which a safety valve 31 is connected and also a steam pipe 32. The lower end of the steam pipe 32 is provided with a drain valve 33 and further provided with branch steam pipes 34 and 35 that extend into the casing 1 with the branch pipe 34 in communication with the lower end of the tank 11 and with the branch pipe 35 in communication with the pipe 22 adjacent the bottom of the tank 21 so that steam may be introduced into either of said tanks 11 or 21. A control valve 36 is located in the branch pipe 35 for the purpose of controlling steam to the tank 21. A control valve 37 is placed in the steam pipe 32 adjacent its lower end and the branch pipe 34 for the purpose of controlling steam to the tank 11. A pressure gauge 38 is connected to the branch pipe 35 between the control valve 36 and the steam pipe 32 whereby the pressure of the steam may be determined at any time. A temperature gauge 39 is connected to the boiler whereby the temperature within the boiler can be determined at any time.

A control lever 40 is pivoted to the casing 1 and is connected to a damper sleeve 41 by an arm 42 slidably mounted in a guide 43 and the damper sleeve located in the chamber 10 of the boiler between the latter and the oil treating tank 11 and by being moved into various adjusted positions vertically in either direction, the heat from the burner 16 may be regulated against the walls of the boiler.

A water gauge 44 is connected to the boiler 9 whereby the amount of water in the boiler may be determined at any time.

In operation, the oil treating tank 21 is first filled with used oil and then allowed to flow into the oil treating tank 11 by opening the valve 23 and when the tank 11 is filled, the control valve 23 is again closed and additional used oil is placed into the tank 21 to fill the latter. The heat from the burner 16 is adapted to heat the boiler for the purpose of generating steam therein and also to heat the tanks 11 and 21. The tank 11 is preferably heated to 500 degrees Fahrenheit while the tank 21 is preferably heated to 250 degrees Fahrenheit. Steam is then admitted to the tanks to thoroughly agitate the oil therein and with the valve 23 in a closed position, the valve 14 is opened to allow the oil within the tank 11 to flow into the filter and after the tank 11 has been drained the valve 14 is closed and the valve 23 is opened to permit the oil within the tank 21 to flow into the tank 11 whence the operation is again repeated. The foreign matter contained within the oil within the filter is adapted to be removed from the oil by the filtering element within the filter and to aid the passing of the oil through the filtering element and outwardly of the filter by the discharge pipe 6 air pressure is conducted to the filter 3 from the supply pipe 7 by opening the control pipe 8.

While we have shown and described the preferred embodiment of our invention, it will be understood that minor changes in construction, combination and arrangement of parts may be made without departing from the spirit and scope of our invention, as claimed.

Having thus described our invention, what we claim is:

1. An oil reclaiming apparatus comprising a supporting structure, superimposed oil treating tanks carried by said structure, means for introducing used oil to said tanks and from one tank to the other tank, means for controlling the oil between said tanks, a steam boiler surrounding the lower tank, a heating means associated with the lower end of the lower tank and the boiler, means for introducing steam from the boiler into the tanks for agitating the oil therein, and a filter for receiving the heated oil from the lower tank.

2. An oil reclaiming apparatus comprising a supporting structure, superimposed oil treating tanks carried by said structure, means for introducing into said tanks used oil, flues extending through said tanks, connecting means between said tanks for admitting oil from the upper tank to the lower tank, a control means for said connecting means, a steam boiler carried by the supporting structure, a heating means associated with the boiler and the lower tank, an expansion tank connected to the lower tank, means for introducing steam into said oil treating tanks from the boiler to agitate the oil, and a filter in communication with the lower tank.

3. An oil reclaiming apparatus comprising a supporting structure, superimposed oil treating tanks carried by said structure, means for introducing into said tanks used oil, flues extending through said tanks, connecting means between said tanks for admitting oil from the upper tank to the lower tank, a control means for said connecting means, a steam boiler carried by the supporting structure, a heating means associated with the boiler and the lower tank, an expansion tank connected to the lower tank, means for introducing steam into said oil treating tanks from the boiler to agitate the oil, a filter in communication with the lower tank, and a regulating sleeve associated with the boiler and the lower tank for varying the heat from the burner to the boiler.

In testimony whereof we affix our signatures.

GRANT GREESON.
BYRON D. TANSEY.